United States Patent [19]

Hoyt et al.

[11] Patent Number: 5,340,886

[45] Date of Patent: Aug. 23, 1994

[54] ACID-DYE RESISTANT POLYAMIDE PRODUCTS AND PROCESS FOR PREPARATION

[75] Inventors: Matthew B. Hoyt, Arden, N.C.; Andrew M. Coons, III, Anderson, S.C.; David N. Dickson, Charlotte, N.C.

[73] Assignee: BASF Corporation, Parsippany, N.J.

[21] Appl. No.: 71,035

[22] Filed: Jun. 2, 1993

Related U.S. Application Data

[63] Continuation of Ser. No. 711,238, Jun. 6, 1991, abandoned, which is a continuation-in-part of Ser. No. 380,916, Jul. 17, 1989, abandoned.

[51] Int. Cl.$^5$ .......................................... C08F 283/04
[52] U.S. Cl. ................................... 525/426; 524/606; 525/420; 525/421
[58] Field of Search ................ 524/606; 525/420, 386, 525/421, 426

[56] References Cited

U.S. PATENT DOCUMENTS

| | | | |
|---|---|---|---|
| 3,328,341 | 6/1967 | Corbin, Jr. et al. | 525/425 X |
| 3,389,549 | 6/1968 | David | 528/337 X |
| 3,637,601 | 1/1972 | Truce et al. | 525/184 X |
| 3,640,942 | 2/1972 | Crampsey | 524/538 |
| 3,689,465 | 9/1972 | Turk | 525/184 X |
| 3,846,507 | 11/1974 | Thomm et al. | 525/432 |
| 3,865,900 | 2/1975 | DeCaprio et al. | 525/182 |
| 3,898,200 | 8/1975 | Lotquist | 528/321 |
| 3,951,599 | 4/1976 | Davis et al. | |
| 3,996,202 | 12/1976 | Keil | 528/337 |
| 4,061,621 | 12/1977 | Lofquist et al. | 525/420 |
| 4,083,893 | 4/1978 | Lofquist | 528/336 |
| 4,097,546 | 6/1978 | Lofquist | 528/313 X |
| 4,166,080 | 8/1979 | Franks et al. | 525/183 |
| 4,374,641 | 2/1983 | Burlone | 524/601 X |
| 4,501,212 | 2/1985 | Slattery | 112/266.2 |
| 4,579,762 | 4/1986 | Ucci | 428/95 |
| 4,592,940 | 6/1986 | Blyth et al. | 428/96 |
| 4,680,212 | 7/1987 | Blyth et al. | 428/97 |
| 4,822,373 | 4/1989 | Olson et al. | 428/96 X |
| 5,108,684 | 4/1992 | Anton et al. | 264/176.1 |

FOREIGN PATENT DOCUMENTS

| | | |
|---|---|---|
| 0373655 | 6/1990 | European Pat. Off. . |
| 0409093A3 | 1/1991 | European Pat. Off. . |
| 0421971A2 | 4/1991 | European Pat. Off. . |
| 1-223908 | 9/1989 | Japan . |
| 1142297 | 2/1969 | United Kingdom . |

OTHER PUBLICATIONS

"Lumena, New Solution-Dyed Nylon Debuts", pp. 1, 9 and 11; Floor Covering Weekly, Nov. 13, 1989.
Database WPIL Section Ch. Week 8830, Derwent Publications Ltd., London, GB: Class A, AN 88-209198 & JP-A-63 145 415.

*Primary Examiner*—Judy M. Reddick
*Attorney, Agent, or Firm*—Nixon & Vanderhye

[57] ABSTRACT

A process for preparing melt spun polymeric fiber made from polymerized amide monomers includes the steps of pigmenting the polymer, incorporating within the polymer sufficient $SO_3H$ groups or salts thereof to give the polymer a sulphur content of between about 10 and about 160 equivalents per $10^6$ grams polymer and thereafter chemically blocking with a chemical blocking agent a portion of amino end groups present in the sulphonated polymer.

8 Claims, No Drawings

ACID-DYE RESISTANT POLYAMIDE PRODUCTS AND PROCESS FOR PREPARATION

This is a continuation of application Ser. No. 0/711,238, filed Jun. 6, 1991, now abandoned, which in turn is a continuation-in-part of application Ser. No. 07/380,916 filed on Jul. 17, 1989 now abandoned.

FIELD OF THE INVENTION

This invention relates generally to synthetic polyamide fibers. More specifically, this invention relates to acid-dye resistant sulphonated polyamide fibers.

BACKGROUND OF THE INVENTION

The term "fiber" as used herein includes fibers of extreme or indefinite length (i.e., filaments) and fibers of short length (i.e., staple). The term "yarn" as used herein means a continuous strand of fibers.

The terms "stain" and "staining" as used herein with reference to polyamide fibers means discoloration of such fibers caused by a chemical reaction thereof with a substance such as an acid dye.

Polyamide fibers are widely used in the home and industry as carpets, drapery material, upholstery and clothing. For instance, carpets made from polyamide fibers are a popular floor covering for residential and commercial applications. Such carpets are relatively inexpensive and have a desirable combination of qualities, such as durability, aesthetics, comfort, safety, warmth, and quietness. Furthermore, such carpets are available in a wide variety of colors, patterns, and textures.

Polyamides may be dyed with acid dyes by forming an ionic bond between the dyes and the protonated terminal amine groups ($-NH_3+$) (which are also known as the polyamide's "free amines" or "free amine end groups") present in the polyamide polymer chain. In certain instances, it is desirable to decrease the dyeability of polyamide fibers, especially nylon 6 fibers which contain a large number of acid dye sites. Such fibers have a reduced affinity for acid dyes. When such fibers are combined with polyamide fibers having a normal dyeability, and dyed, the resulting yarns have a two-tone effect. A representative procedure for reducing the dyeability of polyamide fibers is disclosed in U.S. Pat. No. 3,328,341, to Corbin et al. which is hereby incorporated by reference. Also of interest is British Patent No. 1,142,297 to Burrows.

Corbin et al. describes the use of butyrolactone to reduce the acid dye affinity of otherwise unmodified nylons. The suggested mechanism of action is by reduction of the number of amino end groups.

Although frequently polyamide fibers are anionically dyed, this is not always the case and there are a number of methods to render polyamides cationically dyeable. Some of the problems encountered when rendering polyamides cationically dyeable are ozone stability, shampoo fastness and cross staining. Perhaps the work described in U.S. Pat. No. 3,389,549 to David represents a leading work in this area. That patent discloses the copolymerization of, for example, 5-sulfoisophthalic acid with polyamide monomers, specifically, $\epsilon$-caprolactam.

U.S. Pat. No. 3,846,507 to Thomm et al. describes a blend of polyamides having benzene sulfonate units and unmodified (normal) polyamides. The resulting polyamide has from 20 to 100 sulphonate gram equivalents per $10^6$ grams of total polyamide and from 35 to 80 amine gram equivalents per $10^6$ grams of total polyamide and a certain affinity for cationic dyes.

Polyamides modified with aromatic sulfonate units are taught to have improved acid-dye resistance in U.S. Pat. No. 4,579,762 to Ucci.

While nylon 6,6 containing 5-sulfoisophthalic acid carpet yarns have somewhat acceptable ozone and shampoo fastness, nylon 6 containing 5-sulfoisophthalic carpet yarns that have poor ozone and shampoo fastness, especially after autoclave or superba heat setting.

Allied Chemical Company has modified nylon 6 to contain lithium, magnesium or calcium salts of sulphonated polystyrene which results in nylon 6 copolymer carpet yarns with acceptable ozone and shampoo fastness. Several patents exemplary of the Allied work include, U.S. Pat. Nos. 3,898,200 and 4,097,546, both to Lofquist, and U.S. Pat. No. 4,083,893 to Lofquist et al. Yet, such yarns containing sulphonated polystyrene cross stain with acid dyes more than yarns which contain 5-sulphisophthalic acid.

Due to acid dyeability, polyamide fibers are severely and permanently stained when contacted with certain artificial and natural colorants present in common household beverages. Examples of such beverages include coffee, red wine and soft drinks. One of the commonly used acid-dye colorants used in beverages is FD&C Red Dye No. 40, which is also known as Color Index Food Red 17. When a beverage containing this dye contacts polyamide fibers, severe staining can result. As a result thereof, many carpets containing polyamide fibers such as nylon 6, nylon 66, and the like are replaced not because the carpet wears out, but because of staining.

In an attempt to alleviate the soiling and staining of carpets containing the polyamide fibers, polyamide fibers are sometimes treated with fluorochemicals for the purpose of reducing the tendency of soil adhering to the fibers of the carpet and to reduce wettability of the fibers. Although such a treatment offers some protection against soiling, the treatment affords little protection to the carpet from spills containing acid dye colorants unless the spills are immediately removed from the carpet, i.e., before the carpet has been wetted out with the stain.

Various compounds, sometimes referred to as stain-blockers, including sulfonated aliphatic or aromatic compounds including sulfonated naphthol- or sulfonated phenol-formaldehyde condensation products have been applied to polyamide fibers in order to impart stain resistance to the fibers. Exemplary is U.S. Pat. No. 4,592,940 to Blyth et al. A problem associated with such products is that large amounts of these compounds must be utilized to achieve sufficient stain resistance in certain fibers.

Recently, yarn producers have begun incorporating colored pigments into nylon yarns to improve their resistance to degrading and fading in ultraviolet light, to give improved resistance to chemicals and noxious fumes and to give permanent coloration which is not removed by washing. Exemplary is European Patent Application No. 0 373 655 A2. However, when light shades of pigment are used, acid dye stains from accidental spills are visible on the surface of the filaments.

U.S. Pat. No. 4,374,641 to Burlone describes a color concentrate for pigmenting thermoplastic polymeric materials. A water soluble or dispersible polymer which may be sulphonated is used with a coloring agent which may be a pigment.

While some pigments can be mixed easily into the nylon without adversely affecting the filament spinning operation most pigments cause some difficulties while being mixed into the nylon or in subsequent spinning and drawing operations. In general, organic pigments crosslink nylon, raise its viscosity, form spherulites which weaken the fibers and cause increased draw tension and filament breaks. Many inorganic pigments depolymerize nylon, raise the number of amine ends (thereby increasing the susceptibility of the nylon to acid dye stains), lower the viscosity and also form spherulites. For example, pigments containing iron oxide or zinc ferrite and particularly a combination of the two give very poor operability. Either type of pigment in large particles weakens the fibers, clogs the spinning pack filters and causes breaks. On the other hand, very finely divided pigment agglomerates to form larger masses of varying size causing the same problems as large particles. Such masses also color the polymer unevenly and less effectively due to poor dispersion of the pigment in the polymer.

Patterned or multicolor carpets also can be made by mixing yarns which are not anionically dyeable with synthetic or natural yarns that are.

Thus, there remains a need for a carpet yarn which may be made from common nylon bases and yet has good ozone resistance and fastness to repeated shampooing, as well as resistance to staining by acid dyes.

SUMMARY OF THE INVENTION

The present invention provides a process for preparing a melt spun fiber-forming polymer made from polymerized amide monomers which has relatively permanent color, yet resists anionic dyes. The process includes incorporating within the polymer sufficient $SO_3H$ groups or salts thereof to give the polymer a sulphur content of between about 10 and about 160 equivalents per $10^6$ grams polymer, and after incorporating sufficient $SO_3H$ groups or salts thereof, pigmenting the polymer, and chemically blocking with a chemical blocking agent a portion of amino end groups present in the sulphonated polymer.

Another embodiment of the present invention is a pigmented fiber which resists dyeing with anionic dyes. The fiber is made by incorporating within a polymer sufficient $SO_3H$ groups or salts thereof to give the polymer a sulphur content of between about 10 and about 160 equivalents per $10^6$ grams polymer, pigmenting the polymer, chemically blocking a portion of amino end groups in the sulphonated polymer, the blocking occurring before or during melt spinning and melt spinning the polymer into filaments.

A yet further embodiment of the present invention is acid dye resistant fibrous polymer of polymerized amide units, sulphonated groups incorporated with said amide units and sufficient to provide between about 10 and about 60 sulphur equivalents per $10^6$ grams polymer, an amine end group blocker in a quantity to provide amine equivalence of between about 2 and about 20 equivalents per $10^6$ grams polymer, and a pigment.

It is an object of the present invention to provide an improved process for preparing pigmented polyamide fibers.

A further object of the present invention is to provide an improved stain resistant polyamide fiber.

Related objects and advantages will be apparent to one ordinarily skilled in the relevant art after reviewing the following description.

DETAILED DESCRIPTION OF THE PREFERRED EMBODIMENTS

To promote an understanding of the principles of the present invention, descriptions of specific embodiments of the invention follow and specific language describes the same. It will nevertheless be understood that no limitation of the scope of the invention is thereby intended, and that such alterations and further modifications, and such further applications of the principles of the invention as discussed are contemplated as would normally occur to one ordinarily skilled in the art to which the invention pertains.

Polyamides suitable for use in the present invention include synthetic polymeric material having recurring amide groups (—CO—NH—) as an integral part of the polymer chain. Examples of such polyamides include homopolyamides and copolyamides which are obtained by the polymerization of lactam or aminocaprionic acid or a copolymerization product from mixtures of diamines together with dicarboxylic acids or mixtures of lactams.

Typical polyamides include nylon 6 (poly(epsilon-caprolactam)), nylon 66 (polyhexamethyleneadipamide), nylon 6/10, nylon 6/12, nylon 11, nylon 12, copolymers thereof, or mixtures thereof. Polyamides can be also copolymers of nylon 6 or nylon 6,6 and a nylon salt obtained by reacting a dicarboxylic acid component such as terephthalic acid, isophthalic acid, adipic acid, or sebacic acid with a diamine such as hexamethylenediamine or 1,4-bisaminomethylcyclohexane.

One embodiment of the present invention involves a process for preparing pigmented acid dye resistant nylon based fiber-forming polymers by incorporating into a nylon sufficient sulphonate groups or salts thereof to yield a polymer sulphur content of between about 10 and about 160 equivalents per $10^6$ grams of polymer and pigment. The process further includes the step of chemically blocking a portion of the amino end groups present in the polymer so sulphonated.

In the process, sulphonate groups are incorporated within the polyamide. The sulphonated polymer may be generated by adding sulphonated compounds to the polymerization mixture and polymerizing according to any known process for preparing the polymer of the corresponding polyamide type. Exemplary sulphonated compounds which are useful for incorporating within the polyamide are aromatic sulphonated compounds and their alkali metal salts capable of copolymerizing with polyamide forming raw materials, such as sulphonated styrene, 5-sulfoisophthalic acid, and sulfoalkyloxycarboxylic or sulfoaryloxycarboxcylic acids of the form:

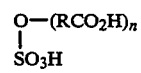

where n=1 or 2 and R is an alkyl or aryl radical; a copolymer of vinyl ether and 2-acrylamido-2methylpropanesulfonic acid poly {2-methyl-2-((1-oxo-2-propenyl) amino)-1-propanesulfonic acid}; 4-chlorocarbonylsulfobenzoic acid anhydride; and saccharine. The sulphonated compound is preferably added in an amount sufficient to result in a sulphur content in the final polymer of between about 10 and about 160 sulphur equivalents per $10^6$ grams polymer. Most preferably, the sulphur content of the final polymer is in the range of from about 31 to about 62 sulphur equivalents per $10^6$ grams of polymer. Sulphur content may be measured by x-ray fluorescence spectroscopy, for example.

The nylon is pigmented by mixing pigment into the molten sulphonated copolymer and then spinning it into a fiber. A wide range of both organic and inorganic pigments may be used. The pigments are generally introduced in the form of a concentrate formulation containing one or more "pure" pigments in a polymer matrix. The number, color and amount of the pigment are, of course, dependent on the final color shade desired.

According to the process, a portion of the amino end groups of the resulting sulphonated polymer is chemically blocked. This chemical blocking occurs by the addition of a compound which chemically interacts with the free amino end groups in the sulphonated nylon polymer. For example, lactones of the general formula:

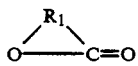

wherein $R_1$ is $(CH_2)_n$ (n is from 2 to about 8) and anhydrides, such as acetic anhydride, maleic anhydride, glutaric anhydride, benzophenonetetracarboxylic dianhydride, napthalene tetracarboxylic dianhydride, benzenetetracarboxylic dianhydride, cyclobutanetetracarboxylic dianhydride, succinic anhydride, benzoic anhydride, acetic formic anhydride and other carboxylic anhydrides of the form:

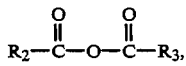

where $R_2$ and $R_3$ are $(CH_2)_nCH_3$, n=0 to 9 or an aromatic group having a total number of carbons up to 9, are useful in the present invention. Presently preferred are caprolactones and butyrolactones.

Caprolactones useful in the present invention are epsilon-caprolactone compounds having the following general formula:

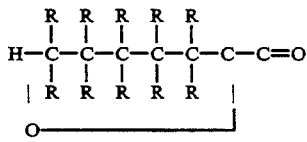

wherein at least six of the R's are hydrogen and the remainder are hydrogen, organic radicals such as straight chain, branched, or cyclic alkyl groups, alkoxy groups, or single ring aromatic groups, none of the groups contain more than about twelve carbon atoms, and the total number of carbon atoms in the groups on a lactone ring does not exceed about twelve carbon atoms. Unsubstituted epsilon-caprolactone (every R is a hydrogen) is derived from 6-hydroxyhexanoic acid and is the preferred epsilon-caprolactone compound for use in the present invention. Substituted epsilon-caprolactones are prepared by reacting a corresponding substituted cyclohexanone with an oxidizing agent, such as peracetic acid.

Examples of organic radicals include alkyl groups such as methyl, ethyl, propyl, isopropyl, butyl, sec-butyl, isobutyl, tert-butyl, pentyl, isopentyl, iso-hexyl, 3methylpentyl, 2,3-dimethylbutyl, heptyl, octyl, nonyl, decyl, undecyl, dodecyl, alkoxy groups such as methoxy, ethoxy, propoxy, isopropoxy, butoxy, sec-butoxy, tert-butoxy, and the like, and substituted or unsubstituted phenyl, cyclohexyl, cyclopentyl, and the like.

Substituted epsilon-caprolactone compounds include various monoalkyl epsilon-caprolactone compounds such as the monomethyl-, monoethyl-, monopropyl-, monoisopropyl-, etc., to monododecyl epsilon-caprolactones; dialkyl epsilon-caprolactones in which two alkyl groups are substituted on the same or different carbon atoms, but not both on the epsilon carbon atom; trialkyl epsilon-caprolactones in which two or three carbon atoms in the lactone ring are substituted; so long as the epsilon carbon atom is not distributed, alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Representative examples of substituted epsilon-caprolactone compounds include:
2-methyl epsilon-caprolactone;
6-ethyl epsilon-caprolactone;
3-propyl epsilon-caprolactone;
4-n-butyl epsilon-caprolactone;
5-isopentyl epsilon-caprolactone;
5,5'-dimethyl epsilon-caprolactone;
2-methyl-6-ethyl epsilon-caprolactone;
6-octyl epsilon-caprolactone;
6-cyclohexyl epsilon-caprolactone;
6-benzyl epsilon-caprolactone;
2,4,6-trimethyl epsilon-caprolactone;
2,3,3'4,5,6-hexamethyl epsilon-caprolactone; and mixtures thereof.

The precise manner that blocking agent functions to reduce staining of the polyamide is not fully understood and need not be. It is believed, however, that the blocking agent reacts with the amino end groups in the polyamide and thus reduces a portion of the acid dye sites normally present therein. The polyamide will then have hydroxy end groups in place of the amine end groups. Regardless of the theory proposed, it is sufficient to point out that the agents operate successfully in the manner disclosed therein.

The amounts of chemical blocking agent added to the fiber-forming polyamide will vary depending on the results desired and the polyamide used in the preparation of the fiber. For instance, since nylon 6 (poly(epsilon-caprolactam)) accepts acid dyes more readily than nylon 66 (polyhexamethylene-adipamide) larger amounts of chemical block agent may be required for nylon 6 than nylon 66 in order to achieve the same amino end group content. Amounts less than about 0.2% by weight based on the weight of the polyamide, in general, do not cause appreciable blocking of the amino end groups and the attendant lowering of dyeability in the polymer. While there is no upper limit with respect to the amount of chemical blocking agent which can be added, it has been found that amounts above about 3% by weight based on the weight of the polyamide do not further reduce the amine end group content by any appreciable extent. By way of illustration, where epsilon-caprolactone is used, amounts of epsilon-caprolactone preferably range from about 0.5% to about 2% by weight based on the weight of the polyamide.

The polyamide fibers of the present invention preferably have a terminal amino-group content of less than 25 equivalents per $10^6$ grams polymer. For light color usage, the fibers preferably have terminal amino-group content in the range of from about 2 to 20 equivalents per $10^6$ grams polymer and, more preferably, a terminal amino group content of from about 4 to about 12 equivalents per $10^6$ grams polymer. Amino group content (or amine equivalence) can be measured by titration of the amino end groups according to the known procedures. In any event, the polymer generally has a resistance to acid dyes such that when exposed to an acid dye, the resulting total color change (CIE L*a*b System Δ E) in the fiber is less than 20 CIE units under the Daylight 5500 Standard Illuminant.

Various methods of incorporating the chemical blocking agents into the polyamide can be utilized, and are known to persons skilled in the art. For example, the agent may be added directly to the polymer melt in any stage of the process prior to extrusion. In one method, the agent is added to granules or chips of polyamide prior to melt formation and thoroughly tumbled therewith to effect adequate mixing. One preferred practice is to add the chemical blocking agent to polyamide chips at a feed zone of an extruder using a feed pump. Subsequently, chemically blocked sulphonated polyamide chips are mixed and melt processed at temperatures usually from about 255° to about 280° C.

Conventional melting and spinning procedures and equipment customarily used in the production of polyamide fibers may be used with the modified polymer and the fiber product may be drawn and processed into yarn by any known means. The resulting yarn can be woven into fabrics or tufted into carpets. Various additives of the type normally used, such as lubricants and mould release agents, nucleating agents, dyes, reinforcing or non-reinforcing fillers, such as mineral fibers, glass and asbestos fibers, microbeads of glass, talcum, silicon dioxide or mica, antistatic agents, and plasticizers may be added to the polymers.

A further aspect of the present invention is the addition of a stain blocker. This aspect is applicable in all of the embodiments. Examples of suitable stainblockers are disclosed in U.S. Pat. Nos. 4,822,373; 4,680,212; and 4,501,212, which are hereby incorporated by reference.

Exemplary stainblockers suitable for use in the present invention include chemicals capable of functioning as stainblockers, such as sulfonated naphthol- or sulfonated phenol-formaldehyde. These products are preferably linear, low molecular weight condensation products, that is, products having an average molecular weight of less than about 1000, for example, in the range of 250 to 700. Such products are water-soluble and may be prepared by conventional art-recognized techniques, for example, by condensation of formaldehyde with one or more phenols in a mole ratio of about 1.0 to 0.8, phenol(s) to formaldehyde, at a pH of less than 7 using an acid catalyst such as HCl, wherein at least one of the phenols is a phenolsulfonic acid or alkali metal salt thereof. Preferably, the phenols comprise, in addition to the sulfonic acid or salt thereof, a sulfone, for example, dihydroxy aromatic diphenol sulfone. Such condensation products contain in addition to sulfonic acid groups or alkali metal salts thereof sulfone groups, i.e.,

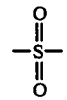

groups.

Other exemplary stainblockers suitable for use in the present invention are condensation products of formaldehyde with bis(hydroxyphenyl)sulfone and phenylsulfonic acid. Instead of, or in addition to, formaldehyde, another aldehyde such as, for example, acetaldehyde, furfuraldehyde, or benzaldehyde, can be used to make the condensation product. Also, other phenolic compounds such as, for example, bis(hydroxyphenyl)alkane, e.g., 2,2-bis(hydroxyphenyl)propane, and bis(hydroxyphenyl)ether compounds can be used instead of, or in addition to, the bis(hydroxyphenyl) sulfone. These products are partially sulfonated, i.e., have a sulfonic acid equivalent weight of about 300–1200, preferably 400–900. Examples of such products are disclosed in U.S. Pat. No. 4,592,940. Also commercially available condensation products are available such as FX-369, a stain release product available from 3M Company, NB001-31-1, available from Peach State Laboratories of Dalton, Ga., Intratex N, available from Crompton and Knowles Corp., Erional Pa., available from Ciba-Geigy Corp., Nylofixan P, available from Sandoz, Ltd., Mesitol NBS, available from Mobay Chemical Corp, Resist #4, available from Lyndal Chemical Co., Ameriolate, available from American Emulsions Co., Inc., and Synthabond 1938, available from Piedmont Chemical Industries. Sulfonation of phenolic compounds is taught, for example, in *Sulfonated and Related Reactions*, E. E. Gilbert, Interscience Publishers, 1965. Condensation of phenolformaldehyde resins is taught, for example, in *Phenolic Resins*, A. Knopf et al., Springer-Verlag, 1985.

From an economic view, condensation products which find particular application include those prepared from relatively inexpensive, commercially available monomers such as phenol, diphenolsulfone, formaldehyde, ortho- and paraphenolsulfonic acids or salts thereof, and mono- and disulfonated diphenolsulfones or salts thereof. Examples of such salts can include the ammonium, sodium, potassium, or lithium salts thereof. In addition to formaldehyde, aldehydes, such as furfuraldehyde or benzaldehyde, are particularly useful. Also, instead of or in addition to phenol or phenols, a corresponding naphthol or naphthols are particularly useful; for example, instead of sodium phenolsulfonate, sodium napththol sulfonate may be used.

The amount of stainblocker utilized should be an amount sufficient to provide the desired degree of stain resistance to the polyamide fiber. Generally, when the substrate is nylon 66, lower amounts can be used than when the substrate is nylon 6. When the polyamide material is a heatset carpet yarn which is heatset under moist conditions, e.g., in an autoclave, generally larger amounts are required than for yarn heatset under substantially dry conditions. Preferably, the amount of stainblocker used is preferably at least about 0.75 weight percent, more preferably at least about 1.0 weight percent, most preferably at least about 1.5 weight percent, based on the weight of the polyamide fiber when the fiber is nylon 66. Preferably, the amount of stainblocker used is preferably at least about 1.0 weight percent, more preferably at least about 1.5 weight percent, based on the weight of the polyamide fiber when the fiber is nylon 6.

The stainblocker can be applied to the polyamide fibers using procedures known to persons skilled in the art. For instance, the stainblocker can be applied from an aqueous solution including for a spin finish. In such applications, the pH of the solution is preferably below about 7, more preferably below about 5.

The stainblocker can also be applied from an aqueous exhaust bath such as is used in beck dyeing of carpet. The stainblocker can be added to the aqueous dye bath solution and exhausted concurrently with the dye. Generally, the dye bath is maintained at a temperature at or near the boiling point for a period of 10 to 90 minutes or more to effect exhaustion of the dye and the stainblocker.

In addition, fluorochemicals can also be applied to the polyamide fibers in combination with the stainblocker. Examples of suitable fluorochemicals are disclosed in U.S. Pat. No. 4,680,212, which is hereby incorporated by reference.

A second embodiment of the present invention is a pigmented fibrous polyamide which is sulphonated and has an amine equivalence of between 6 and 20 equivalents per $10^6$ grams of the polymer. This pigmented polyamide may be prepared, for example, according to the first embodiment of the invention. Polyamide fibers of this embodiment are conveniently mixed with anionically dyeable fibers since they resist cross staining.

A third embodiment of the present invention concerns a carpet prepared by mixing yarns of the present invention with anionically dyeable yarns. With such a combination, tone on tone, patterns and other color effects are easily achievable since the pigmented fiber of the invention resists acid dyes, the true pigmented color comes through even after dyeing the regular anionically dyeable fibers.

The invention will now be described by referring to the following detailed examples. These examples are set forth by way of illustration and are not intended to be limiting in scope.

EXAMPLE 1-21

Twenty-one (21) 2600 denier 135 filament yarns are prepared using seven levels of the addition of butyrolactone and three combinations of nylon chip. Samples 1-7 are prepared by typical nylon 6 spinning conditions with the butyrolactone added at the given amount at the extruder throat. Samples 8 through 14 are prepared with typical nylon 6 spinning conditions but nylon 6 containing 0.29% by weight sulfur was added to the unmodified nylon melt via a metered side-arm extruder. Samples 15-21 are prepared by extruding sulfur-containing nylon 6. In samples 8-21, the butyrolactone was added in the given amount at the extruder throat. Each yarn is as a two-step BCF type yarn. Yarns are knitted into fabric. The fabric is stained by immersing it in a children's soft drink (Cherry Kool-Aid prepared according to label but without sugar) for 15 minutes at room temperature. The fabric is then immediately rinsed with cold water and allowed to dry. The depth of staining is determined by a spectrophotometer and evaluated by total color difference calculations. As in the following example the illuminant was Daylight 5500 and the CIE L*a*b* system were used to calculate the total color difference ($\Delta E$). Butyrolactone (BL) was added at the throat of the fiber extruder.

Table 1 below summarizes the results for each example.

TABLE 1

| Example # | % Nylon 6 | % Sulphonated Nylon 6 | % BL | AEG (meq/kg) | $\Delta E$ |
|---|---|---|---|---|---|
| 1 | 100 | 0 | 0 | 35 | 73 |
| 2 | 99.75 | 0 | 0.25 | 33 | 72 |
| 3 | 99.5 | 0 | 0.5 | 28 | 71 |
| 4 | 99.25 | 0 | 0.75 | 23 | 69 |
| 5 | 99.0 | 0 | 1.0 | 19 | 65 |
| 6 | 98.5 | 0 | 1.5 | 13 | 63 |
| 7 | 98.0 | 0 | 2.0 | 12 | 61 |
| 8 | 66.7 | 33.3 | 0 | 34 | 50 |
| 9 | 66.5 | 33.3 | 0.25 | 31 | 47 |
| 10 | 66.3 | 33.2 | 0.5 | 27 | 43 |
| 11 | 66.2 | 33.1 | 0.75 | 21 | 40 |
| 12 | 66.0 | 33.0 | 1.0 | 16 | 36 |
| 13 | 65.7 | 32.8 | 1.5 | 14 | 35 |
| 14 | 65.3 | 32.7 | 2.0 | 11 | 35 |
| 15 | 0 | 100 | 0 | 28 | 24 |
| 16 | 0 | 99.75 | 0.25 | 24 | 22 |
| 17 | 0 | 99.5 | 0.5 | 22 | 22 |
| 18 | 0 | 99.25 | 0.75 | 19 | 21 |
| 19 | 0 | 99.0 | 1.0 | 14 | 20 |
| 20 | 0 | 98.5 | 1.5 | 12 | 20 |
| 21 | 0 | 98.0 | 2.0 | 8.4 | 20 |

EXAMPLE 22

The sulfur containing nylon 6 is polymerized in a continuous reactor. Normal nylon 6 continuous reactor conditions are used. However, 2.3 parts of a sodium salt of 5-sulfoisophthalic acid are added to 100 parts caprolactam in the feed in a concentrated aqueous solution. Hexamethylenediamine is added at the head of the continuous polymerization vessel. Post-condensation is used to bring the nylon 6 to a desired sulfuric acid relative viscosity of 2.7. Caprolactone is metered at 1.2% addition at the throat of the main extruder.

Beige pigmentation is added as a 25% color concentrate in a nylon matrix. This addition is accomplished by metered addition to the polymer stream through a second extruder (sidearm extruder system). A beige filament is extruded, quenched and wound up.

COMPARATIVE EXAMPLES

EXAMPLE 23

A nylon 6 [BS700F] carpet yarn available from BASF is spun (1200 denier 56 filament with a pentagonal 6-hole cross section) according to a two-step process and knitted into a fabric. The yarn is very lightly pigmented grey by the addition of 0.05% by weight carbon black to the melt.

EXAMPLE 24

Using the same spinning process as used to prepare sample 23, a 1200 denier 56 filament yarn is spun with nylon 6 and 0.05% carbon black. However, at the extruder throat 1.2% by weight caprolactone (CLO) is added.

EXAMPLE 25

Using the same spinning process as used to prepare sample 23, a 1200 denier 56 filament is spun containing cationically dyeable nylon polymer that is modified with 5-sulfoisophthalic acid. The polymer contains 0.29% by weight sulfur. 0.05% carbon black is added.

EXAMPLE 26 (invention)

Using the same spinning process as used to prepare sample 24, a 1200 denier 56 filament yarn is spun. The nylon 6 modified with 5-sulfoisophthalic acid is used to achieve 0.29% by weight sulfur. 0.05% by weight carbon black was added.

Stain Procedure

Fabric made from each of the above is stained with Color Index Food Red 17 (CIFR 17). A bath of 2.5 grams per liter of CIFR 17 (using Sauer's Red Food Coloring) is pH adjusted to 2.5 with citric acid. The bath to fabric ratio is 10:1 by weight. Fabric is immersed in the bath at room temperature for 5 minutes. The sample is removed from the bath and placed on a screen to air dry at room temperature for 24 hours. After drying, the fabrics are rinsed with cold water.

Evaluation

After drying, the samples are examined by a spectrophotometer. The total color difference ($\Delta E$) between the unstained and stained samples is calculated using the CIE L*a*b* system for a Daylight 5500 standard illuminate. Further details on CIE L*a*b* measurements and calculation of total color difference ($\Delta E$) may be found in the color science literature, for example, F. Billmeyer, and M. Saltzman,

Principles of Color Technology, 2nd Edition

Generally, for carpets, a E less than 5 is considered substantially unstained. 5 to 10 is very lightly stained. Greater than 10 is a significant stain.

Results for stain testing and amino end group testing for the samples are given in Table 2 below:

TABLE 2

| Example No. | $\Delta E$ | AEG (meq/kg) |
|---|---|---|
| 23 | 27.05 | 37 |
| 24 | 18.09 | 6.3 |
| 25 | 12.69 | 32 |
| 26 | 7.21 | 4.4 |

What is claimed is:

1. A process for preparing melt spun fiber-forming polymer made from polymerized amide monomers having relatively permanent color yet resisting anionic dyes comprising:
   incorporating within the polymer sufficient $SO_3H$ groups or salts thereof to give the polymer a sulphur content of between about 10 and about 160 equivalents per $10^6$ grams polymer; and after said incorporating,
   pigmenting the polymer, and
   chemically blocking amino end groups present in the sulphonated polymer with an amount of chemical blocking agent sufficient to provide an amino end group content of less than 25 equivalents per $10^6$ grams polymer.

2. The process of claim 1 wherein the chemical blocking agent is one of the following:
   lactones of the formula:

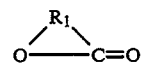

wherein $R_1$ is $(CH_2)_n$ and n is from 2 to about 8;
   acetic anhydride;
   maleic anhydride;
   glutaric anhydride;
   benzophenonetetracarboxylic dianhydride;
   napthalene tetracarboxylic dianhydride;
   benzenetetracarboxylic dianhydride;
   cyclobutanetetracarboxylic dianhydride;
   succinic anhydride;
   benzoic anhydride;
   acetic formic anhydride; and
   other carboxylic anhydrides of the formula:

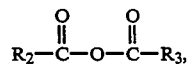

where $R_2$ and $R_3$ are $(CH_2)_nCH_3$, n=0 to 9 or an aromatic group having up to 9 carbons.

3. The process of claim 2 wherein said blocking provides the polymer with an amine end group equivalence of from about 2 to about 20 equivalents per $10^6$ grams polymer.

4. The process of claim 3 wherein the amine group equivalence is from about 4 to about 12 equivalents per $10^6$ grams polymer.

5. The process of claim 4 wherein the chemical blocking agent is caprolactone.

6. The process of claim 4 wherein the chemical blocking agent is butyrolactone.

7. The process of claim 1 wherein said incorporating is achieved through reacting the amide monomers with at least one sulphonated compound or a salt thereof selected from the group consisting of:
   5-sulfoisophthalic acid;
   sulphonated styrene;
   a sulfoalkyloxycarboxylic or sulfoaryloxycarboxylic acid having the structural formula:

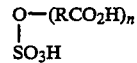

where n=1 or 2 and R is an alkyl or aryl radical; a copolymer of vinyl ether and 2-acrylamido-2-methyl propanesulfonic acid;
   poly{2-methyl-2-((1-oxo-2-propenyl)amino)- 1-propanesulfonic acid}; 4-chlorocarbonylsulfobenzoic acid anhydride; and saccharine.

8. The process of claim 7, wherein the sulfur content of the polyamide is between 60 and 100 equivalents per $10^6$ grams polymer.

* * * * *